United States Patent
Fortuna et al.

(10) Patent No.: US 12,239,913 B2
(45) Date of Patent: Mar. 4, 2025

(54) PREDICTIVE ANALYSIS OF GAMEPLAY TRAJECTORIES

(71) Applicant: SONY INTERACTIVE ENTERTAINMENT LLC, San Mateo, CA (US)

(72) Inventors: Ellana Fortuna, San Mateo, CA (US); Erikka Thompson, San Mateo, CA (US); Sarah Karp, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 86 days.

(21) Appl. No.: 18/214,735

(22) Filed: Jun. 27, 2023

(65) Prior Publication Data

US 2023/0338857 A1   Oct. 26, 2023

Related U.S. Application Data (63) Continuation of application No. 17/403,269, filed on Aug. 16, 2021, now Pat. No. 11,724,199.

(51) Int. Cl.
   *A63F 13/00*   (2014.01)
   *A63F 13/49*   (2014.01)
   *A63F 13/533*  (2014.01)
   *A63F 13/79*   (2014.01)

(52) U.S. Cl.
   CPC .............. *A63F 13/79* (2014.09); *A63F 13/49* (2014.09); *A63F 13/533* (2014.09); *A63F 2300/5546* (2013.01); *A63F 2300/638* (2013.01)

(58) Field of Classification Search
   None
   See application file for complete search history.

(56) References Cited

U.S. PATENT DOCUMENTS

| | | | |
|---|---|---|---|
| 6,722,984 B1 * | 4/2004 | Sweeney, Jr | A63F 13/44 463/37 |
| 8,437,771 B1 | 5/2013 | Coverstone | |
| (Continued) | | | |

FOREIGN PATENT DOCUMENTS

| | | |
|---|---|---|
| CN | 115705385 A | 2/2023 |
| CN | 115706834 A | 2/2023 |
| (Continued) | | |

OTHER PUBLICATIONS

European Application No. 22188602.1 Extended European Search Report dated Jan. 4, 2023.

(Continued)

*Primary Examiner* — Paul A D'Agostino
(74) *Attorney, Agent, or Firm* — Kilpatrick Townsend & Stockton LLP (57) ABSTRACT

Systems and methods are provided for monitoring gameplay trajectories for stopping points and applying a time-based setting. The gameplay trajectories may be based on patterns within real-time gameplay data. The server may predict one or more stopping periods within a gameplay session based on a comparison of the gameplay trajectory data to the time-based setting. Then, the setting may be applied to generate options for transitioning out of the gameplay session at a next predicted timing point.

20 Claims, 5 Drawing Sheets

(56) References Cited

U.S. PATENT DOCUMENTS

| | | | | |
|---|---|---|---|---|
| 8,881,225 | B1* | 11/2014 | Caola | H04W 12/08 709/224 |
| 8,932,132 | B2* | 1/2015 | Sakai | A63F 13/75 709/219 |
| 10,361,802 | B1* | 7/2019 | Hoffberg-Borghesani | G06F 3/00 |
| 10,417,695 | B1* | 9/2019 | Hiatt | G06Q 30/0643 |
| 11,724,198 | B2 | 8/2023 | Fortuna et al. | |
| 2002/0054068 | A1* | 5/2002 | Ellis | H04N 7/088 715/716 |
| 2003/0163811 | A1* | 8/2003 | Luehrs | H04N 21/454 725/30 |
| 2006/0105838 | A1* | 5/2006 | Mullen | A63F 13/525 463/31 |
| 2007/0053513 | A1 | 3/2007 | Hoffberg | |
| 2007/0111794 | A1* | 5/2007 | Hogan | A63F 13/335 463/42 |
| 2007/0157220 | A1 | 7/2007 | Cordray et al. | |
| 2008/0096663 | A1 | 4/2008 | Lieberman et al. | |
| 2008/0192820 | A1* | 8/2008 | Brooks | H04N 21/2385 348/E7.071 |
| 2009/0131152 | A1* | 5/2009 | Busse | H04N 21/4826 463/23 |
| 2009/0174702 | A1* | 7/2009 | Garbow | G06Q 50/265 345/419 |
| 2009/0217342 | A1 | 8/2009 | Nadler | |
| 2009/0254656 | A1* | 10/2009 | Vignisson | G06F 16/9535 709/224 |
| 2010/0081508 | A1 | 4/2010 | Bhogal et al. | |
| 2011/0072452 | A1* | 3/2011 | Shimy | H04N 21/44218 725/25 |
| 2011/0183754 | A1 | 7/2011 | Alghamdi | |
| 2011/0258049 | A1 | 10/2011 | Ramer et al. | |
| 2012/0278179 | A1 | 11/2012 | Campbell et al. | |
| 2012/0308192 | A1* | 12/2012 | Chung | H04N 21/4532 386/230 |
| 2013/0031601 | A1* | 1/2013 | Bott | G06F 21/552 726/28 |
| 2013/0040629 | A1* | 2/2013 | Sprigg | H04N 21/25841 455/419 |
| 2013/0061260 | A1 | 3/2013 | Maskatia et al. | |
| 2014/0181910 | A1* | 6/2014 | Fingal | H04L 63/107 726/4 |
| 2014/0329589 | A1 | 11/2014 | Hawver | |
| 2015/0024838 | A1* | 1/2015 | Beechey | G06F 21/56 463/29 |
| 2015/0281793 | A1 | 10/2015 | Wheatley et al. | |
| 2015/0288571 | A1* | 10/2015 | Baughman | H04L 41/147 703/21 |
| 2015/0312609 | A1 | 10/2015 | Hoctor et al. | |
| 2016/0225278 | A1 | 8/2016 | Leddy | |
| 2016/0248766 | A1* | 8/2016 | Tembey | H04L 63/102 |
| 2016/0300388 | A1 | 10/2016 | Stafford et al. | |
| 2016/0330078 | A1* | 11/2016 | Bostick | H04W 4/21 |
| 2016/0373891 | A1 | 12/2016 | Ramer et al. | |
| 2017/0083715 | A1* | 3/2017 | Gupta | G06F 11/3024 |
| 2017/0085569 | A1* | 3/2017 | Gupta | H04L 67/535 |
| 2017/0186019 | A1* | 6/2017 | Loeb | G07F 17/3227 |
| 2017/0201779 | A1 | 7/2017 | Publicover | |
| 2017/0216721 | A1* | 8/2017 | Nomura | G06F 13/00 |
| 2017/0225079 | A1 | 8/2017 | Conti et al. | |
| 2017/0270021 | A1 | 9/2017 | Sarangdhar et al. | |
| 2017/0339458 | A1* | 11/2017 | Patel | H04N 21/43615 |
| 2017/0339466 | A1* | 11/2017 | Patel | H04N 21/25841 |
| 2018/0256981 | A1 | 9/2018 | Enomoto | |
| 2018/0278997 | A1* | 9/2018 | Isbiliroglu | H04N 21/4751 |
| 2018/0352302 | A1 | 12/2018 | Roe et al. | |
| 2019/0014367 | A1* | 1/2019 | Thomas | H04N 21/458 |
| 2019/0022533 | A1* | 1/2019 | Asanuma | H04N 21/4532 |
| 2019/0052471 | A1 | 2/2019 | Panattoni et al. | |
| 2019/0058958 | A1 | 2/2019 | Proctor et al. | |
| 2019/0082229 | A1* | 3/2019 | Grumer | H04N 21/25866 |
| 2019/0208242 | A1* | 7/2019 | Bates | H04N 21/251 |
| 2019/0220290 | A1* | 7/2019 | Yu | G06F 3/04847 |
| 2019/0230091 | A1* | 7/2019 | Marlin | G06F 21/6218 |
| 2019/0270007 | A1 | 9/2019 | Stine et al. | |
| 2019/0270021 | A1* | 9/2019 | Hume | A63F 13/87 |
| 2019/0347675 | A1 | 11/2019 | Yang et al. | |
| 2019/0349619 | A1* | 11/2019 | Hou | G06N 3/08 |
| 2019/0392729 | A1* | 12/2019 | Lee | G09B 19/0038 |
| 2020/0021889 | A1* | 1/2020 | Ko | H04N 21/44204 |
| 2020/0026523 | A1* | 1/2020 | Young | G06F 11/302 |
| 2020/0037038 | A1* | 1/2020 | Shoop | H04N 21/478 |
| 2020/0351317 | A1* | 11/2020 | Yousef | H04L 65/613 |
| 2020/0409314 | A1* | 12/2020 | Overhoff | G04C 3/002 |
| 2020/0410888 | A1* | 12/2020 | Foster | G09B 19/00 |
| 2021/0234866 | A1 | 7/2021 | Michalowitz et al. | |
| 2021/0370183 | A1 | 12/2021 | Dom et al. | |
| 2022/0008830 | A1* | 1/2022 | Valencia | A63F 13/79 |
| 2022/0110264 | A1 | 7/2022 | Fortuna | |
| 2023/0047065 | A1* | 2/2023 | Fortuna | A63F 13/79 |
| 2023/0051771 | A1 | 2/2023 | Fortuna | |

FOREIGN PATENT DOCUMENTS

| | | |
|---|---|---|
| EP | 3533505 A | 9/2019 |
| EP | 4134144 A1 | 2/2023 |
| EP | 4137979 A1 | 2/2023 |
| JP | 2023026335 A | 2/2023 |
| JP | 2023027008 A | 3/2023 |

OTHER PUBLICATIONS

European Application No. 22188602.1 Extended European Search Report dated Dec. 16, 2022.

U.S. Appl. No. 17/403,269 Final Office Action mailed Dec. 8, 2022.

U.S. Appl. No. 17/403,269 Office Action mailed Jun. 7, 2022.

U.S. Appl. No. 17/399,773 Office Action mailed Nov. 15, 2022.

U.S. Appl. No. 17/403,269, Ellana Fortuna, Parental Control of Gameplay Sessions, filed Aug. 16, 2021.

U.S. Appl. No. 17/399,773, Ellana Fortuna, Intelligent Recommendations for Gameplay Session Adjustment, filed Aug. 11, 2021.

* cited by examiner

PREDICTIVE ANALYSIS OF GAMEPLAY TRAJECTORIES

CROSS-REFERENCE TO RELATED APPLICATION

This application is a continuation and claims the priority benefit of U.S. patent application Ser. No. 17/403,269 filed Aug. 16, 2021, which is incorporated by reference herein in its entirety.

BACKGROUND OF THE INVENTION

1. Field of the Invention

The present technology pertains to providing supervising controls for gameplay of interactive content titles. More specifically, the present technology pertains to providing predictive customization of supervisory controls over gameplay.

2. Description of the Related Art

Presently available gaming platforms may offer settings that allow parental or supervising accounts to set rules and permissions over other accounts. Such rules and permissions generally pertain to limiting time spent on gameplay to predetermined time periods, limiting access to content associated with certain ratings, and limiting spending or other types of transactions within the game platform. Such supervisory controls typically entail setting a rigid limit such when a player account reaches the limit, further gameplay may be completely blocked. Such rigid limits may be frustrating for players while not necessarily being commensurate with parental or other supervisory goals in all situations.

For example, a player may be meet a time limit when a player is playing with teammates (e.g., fighting a boss) or otherwise at a point during gameplay that cannot be saved or delayed. Because the player is engaged in interaction with the virtual environment, it may be difficult to communicate a request for even a small amount of additional time to finish a current activity. Conversely, the parent or supervisor may therefore be required to continually adjust the limits as conditions change, which may be time-consuming and frustrating for the parent or supervisor. In addition to continual adjustments, having to remember to revisit and reset the limits adds to the cognitive load of the parent or supervisor, thereby resulting in a poor user experience for both player and parent/supervisor.

Therefore, to provide a more tailored and customizable set of supervising controls, there is a need in the art for improved systems and methods for performing predictive analysis (e.g., common or natural stopping points) of gameplay and coordinating controls by supervising user accounts relative to such predictions.

SUMMARY OF THE CLAIMED INVENTION

Disclosed are systems, apparatuses, methods, computer readable medium, and circuits for applying controls on monitored gameplay. According to at least one example, a method includes: storing information in memory regarding a supervisory user account associated with one or more player accounts, the stored information including a setting preference; receiving data regarding gameplay of an interactive content title by one of the player accounts during a gameplay session, the gameplay data received from a user device over a communication network; predicting one or more starting and/or stopping timing points in one or more stopping periods within the gameplay session, wherein predicting the one or more starting and/or stopping timing points is based on a comparison of the gameplay data to historical gameplay data; applying the setting preference at a next predicted timing point.

For example, the supervising control server stores information in memory regarding a supervisory user account associated with one or more player accounts, the stored information including a setting preference; receives data regarding gameplay of an interactive content title by one of the player accounts during a gameplay session, the gameplay data received from a user device over a communication network; predicts one or more starts and/or stops timing points in one or more stopping periods within the gameplay session, wherein predicting the one or more starting and/or stopping timing points is based on a comparison of the gameplay data to historical gameplay data; applies the setting preference at a next predicted timing point.

In another example, a supervising control server for applying controls on monitored gameplay is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the supervising control server to: store information in memory regarding a supervisory user account associated with one or more player accounts, the stored information including a setting preference; receive data regarding gameplay of an interactive content title by one of the player accounts during a gameplay session, the gameplay data received from a user device over a communication network; predict one or more start and/or stop timing points in one or more stopping periods within the gameplay session, wherein predicting the one or more starting and/or stopping timing points is based on a comparison of the gameplay data to historical gameplay data; apply the setting preference at a next predicted timing point.

DETAILED DESCRIPTION

Aspects of the present disclosure include systems and methods for monitoring gameplay data for stopping points and relaying such information to a supervising control server. The monitored gameplay may be based on object data received from an object server. The supervising control server may predict one or more starting and/or stopping timing points in stopping periods within a gameplay session. The predicting of the one or more starting and/or stopping timing points may be based on a comparison of the gameplay data to historical gameplay data. A setting preference set by a supervisory account may be applied to a next predicted timing point. For example, the setting preference may cause the gameplay session to pause, to save, and/or to convey a message.

Figure 1:
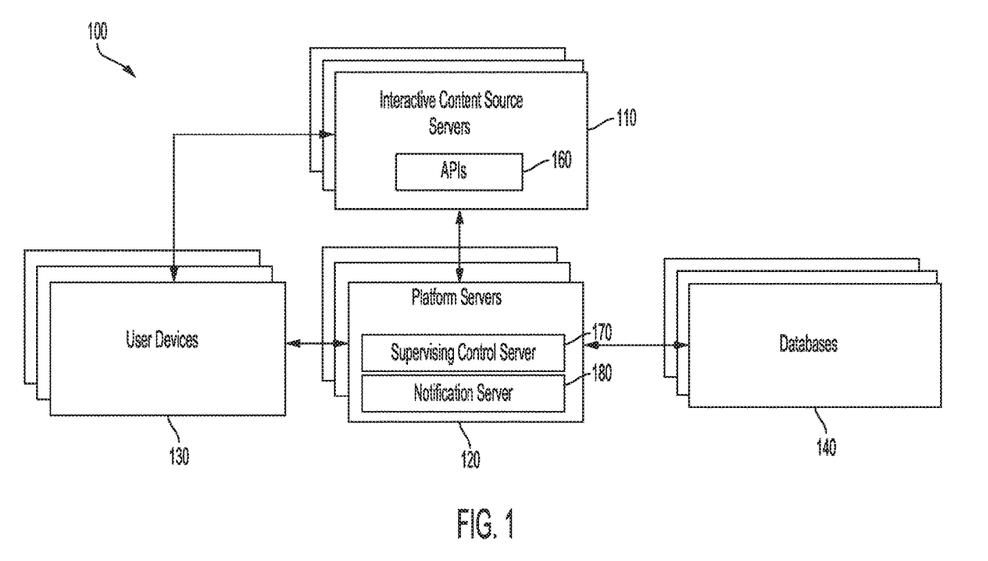
FIG. 1 illustrates an exemplary network environment in which a system for providing predictive customization of supervisory controls over gameplay may be implemented.

FIG. 1 illustrates an exemplary network environment 100 in which a system for providing predictive customization of supervisory controls over gameplay may be implemented. The network environment 100 may include one or more interactive content source servers 110 that provide streaming content (e.g., interactive content titles, game titles, interactive video, podcasts, etc.), one or more platform servers 120, one or more user devices 130, and one or more databases 140.

Interactive content source servers 110 may maintain, stream, and host interactive media titles available to stream to a user device 130 over a communication network. Interactive content source servers 110 may include game servers and may be implemented in the cloud (e.g., one or more cloud servers). Each media title may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in further detail with respect to FIGS. 2 and 3.

The platform servers 120 may be responsible for communicating with the different interactive content source servers 110, databases 140, and user devices 130. Such platform servers 120 may be implemented on one or more cloud servers. The platform servers 120 may include a supervising control server 170 and notification server 180, each of which may further be associated with one or more databases 140.

Supervising control server 170 may have access to a variety of databases 140, including databases that store data regarding gameplay of various game titles by different players. Such stored gameplay data may include media files and activity files (described in further detail in relation to FIG. 2). Supervising control server 170 may apply artificial intelligence, machine learning, and other analyses to the historical and real-time gameplay data within such files in order to identify gameplay patterns and generate predictions regarding a current gameplay session of a particular player. The historical and real-time gameplay data used in the analysis may be associated with the same player, but may also include gameplay data associated with other players identified as being similar to the player in relation to player profile and/or game parameters (e.g., similar skill levels, experience levels, game titles player, number of gameplay sessions, in-game achievements, rankings, team status). In addition, gameplay patterns identified for similar players may also be evaluated to determine whether the same gameplay patterns might be indicated for a current player. Such gameplay patterns may pertain to parameters regarding the player, the avatar, in-game avatar characteristics and status, game environment and associated in-game conditions, other players, in-game events, in-game objects, in-game characters, etc., associated with the current gameplay session.

Identified patterns—including emerging patterns that match previously identified patterns—may provide a basis for predictive analysis as to a player's current trajectory of gameplay. For example, a player's current gameplay pattern may align (within a predetermined margin of error) with patterns that are indicative of an imminent loss or win (or other imminent in-game event, such as completion of a goal or level). Using such patterns and pattern matching, supervising control server 170 may predict a likely stopping point (and/or next save point) for the player.

Supervising control server 170—in conjunction with one or more databases 140—may also store supervisory profiles for each supervising account, which may be made accessible to a parent, guardian, caretaker, or other individual having supervisory authority over a player. The supervisory profile may store any variety of rules, policies, or goals selected or otherwise set by a user of the supervising account. Such rules, policies, or goals may set limits, which may either be strictly enforced or automatically adjusted based on various conditions. For example, a rule may associate a specified time period of gameplay (e.g., an hour) with a specified time period (e.g., usable within the next 2 days) or expiration data (e.g., a week). Thus, a parent may reward a child player with additional gameplay time that cannot be hoarded over the course of multiple weeks or months. In another example, the rules, policies, or goals may also specify automatically throttling or otherwise limiting gameplay time during a school week, school year, or other specified time period ((e.g., finals week, ahead of school projects), as well as also automatically lifting such restrictions and allowing additional gameplay time on weekends, holidays, summers, etc.

Supervising control server 170 may identify when such predictions diverge beyond a predetermined threshold from a parent or supervisory control setting that is based on the stored rules, policies, or goals. For example, the parent or supervisor (e.g., via a supervisory application of a user device) may have selected or provided certain control settings pertaining to limits as to a total amount of time allowed on gameplay (e.g., by session, day, week, month, etc.). As the player engages in gameplay, therefore, real-time predictive analytics may be performed by supervising control server 170 to determine not just the likely end point of gameplay, but also whether the likely end point is approaching the time limit set by the supervisory application. Using such predictive analytics, supervising control server 170 may further operate to apply control settings. In some embodiments, each rule, policy, or goal may also be associated with a predetermined amount of transition or flexible time that may be used automatically adjust application of the specified gameplay time limit. Such automatic adjustment may further be based on a prediction that the additional time needed to complete a level falls within the specified gameplay time limit.

The platform servers 120 may also include a notification server 180 that receives predictive analytics and/or control setting instructions from supervising control server 170. Such control setting instructions may be executed by notification server 180 to generate and send notifications to either the user device 130 of the player engaged in the gameplay session or another user device associated with the supervising user account. The supervising control server 170 may include the notification sever 180 or may be separate from the notification sever 180. The user device of the player may be notified upon embarking on a tier or level predicted to end past a time limit of an applicable control setting, as well as notified at predetermined time periods before the time limit is met, when the time limit is met, and (if the player is allowed to and does continue playing) when a predetermined threshold past the time limit is met. Thus, the player may be provided with ample notice as to when and how quickly they are approaching a time limit so as to be able to transition smoothly out of the game session (e.g., save game data, hand off team duties, bid team, competitor (s), and friends good-bye) rather than be subject to an abrupt termination. The notification server 180 may send such message(s) to the user device 130 engaged in the gameplay session and present such message(s) within an overlay within a display of the user device 130 without pausing the gameplay session.

The notification server 180 may also send notifications to the supervising account regarding the predictive analytics, as well as whether a predicted remaining time period of gameplay left surpasses a limit set by the supervisory account. The estimated period of time may be calculated based on the next predicted stopping period, which may be calculated based on comparisons to historical gameplay data patterns. The message may be a customized message that is relayed from the supervising account or a message pertaining to an estimated period of time remaining before a next stopping point that falls within a total allotted time set by the supervising account. Some embodiments of the message may also provide the supervisor with selectable options for adding a new transition time (e.g., based on a small amount of remaining time left according to the prediction), adjusting a default or previously set transition time (e.g., as recommended based on the prediction), or strictly enforcing the limit. In some embodiments, the message may provide further options for coordinating messages to the player or applying control settings to the player's gameplay session based on the predictions.

The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 5.

The databases 140 may be stored on the platform server 120, the media streaming servers 110, any of the servers 218 (examples shown in FIG. 2), on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game avatars, etc.) and may be associated to media.

Figure 2:
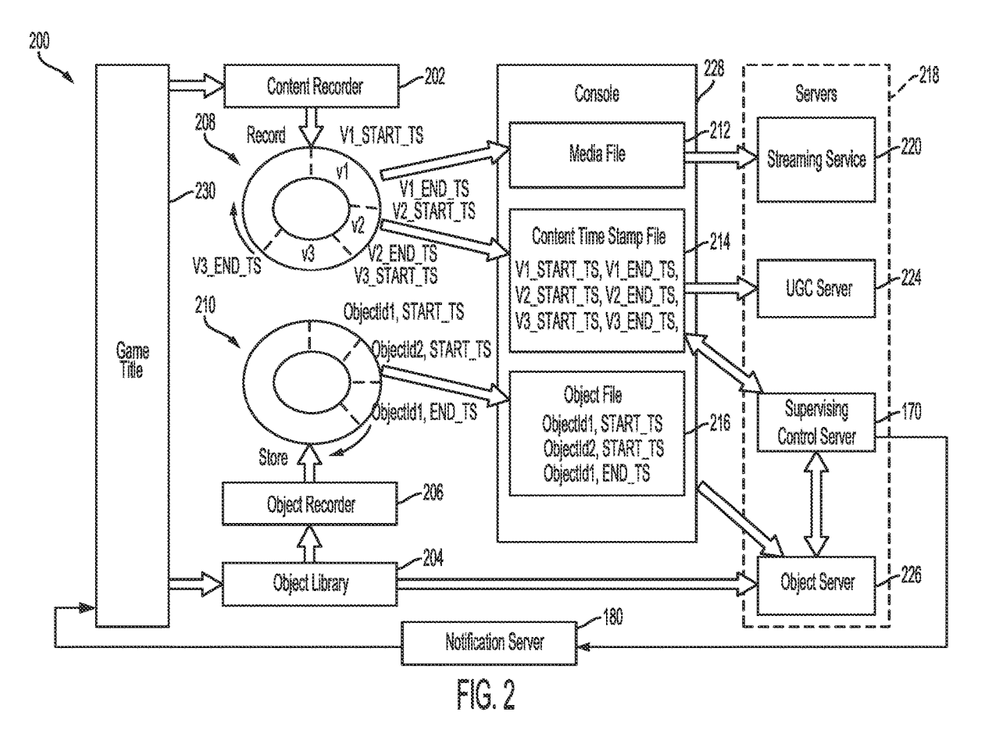
FIG. 2 illustrates an exemplary uniform data system (UDS) that may be used to provide data to a system for providing predictive customization of supervisory controls over gameplay.

FIG. 2 illustrates an exemplary uniform data system (UDS) 200 that may be used to provide data to a system for providing predictive customization of supervisory controls over gameplay. As illustrated in FIG. 2, UDS 200 may include an example console 228 and example servers 218 (e.g., a streaming server 220, a UGC server 224, and a supervising control server 170, and an object server 226), which may receive object data and media files recorded by the object recorder 206 and the content recorder 202, respectively.

The console 228 may be implemented on the platform server 120, a cloud server, or on any of the servers 218. The console 228 may further includes a content recorder 202 and an object recorder 210, described in more detail below, where content (e.g., media) may be recorded and outputted through the console 228. The game titles 230 may be executed on the console 228. Alternatively, or in addition to, the content recorder 202 may be implemented on the platform server 120, a cloud server, or on any of the servers 218.

Such content recorder 202 may receive and record content (e.g., media) from an interactive content title 230 (e.g., game servers 110) onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 (e.g., a portion of the streaming media) may be uploaded to the streaming server 220 for storage and subsequent streaming or use, though the media file 212 may be stored on any server, a cloud server, any console 228, or any user device 130. The media file 212 may be uploaded periodically and/or in real-time or close to real-time. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the UGC server 224, though the content time stamp file 214 may be stored on any server, a cloud server, any console 228, or any user device 130.

Concurrent to the content recorder 202 receiving and recording content from the interactive content title 230, an object library 204 receives object data from the interactive content title 230, and an object recorder 206 tracks the object data to determine when an object beings and ends. Such object data may be uploaded periodically and/or in real-time or close to real-time. The object library 204 and the object recorder 206 may be implemented on the platform server 120, a cloud server, or on any of the servers 218. When the object recorder 206 detects an object beginning, the object recorder 206 receives object data (e.g., user interaction with the object, object ID, object start times, object end times, object results, object types, etc.) from the object library 204 and records the object data onto an object ring-buffer 208 (e.g., ObjectID1, START_TS; ObjectID2, START_TS; ObjectID3, START_TS). Such object data recorded onto the object ring-buffer 208 may be stored in an object file 216.

Such object file 216 may also include object start times, object end times, an object ID, object results, object types (e.g., competitive match, quest, task, etc.), user or peer data related to the object. For example, an object file 216 may store data regarding an activity, an in-game item, a zone, an actor, a mechanic, a game media, as will be discussed in detail with respect to FIG. 3. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the object server 226 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for the object file 216. Such query may be executed by searching for an activity ID of the object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 214, 216.

The supervising control server 170 may receive media files and activity files that include historical and real-time data used to identify gameplay patterns of a current gameplay session of a particular player, match the identified patterns to gameplay patterns of historical sessions, and make predictions regarding a likely trajectory of the current gameplay session. For example, object data (described in more detail below) may provide insights as to what is currently occurring during gameplay. The supervising control server 170 may further determine the natural stopping periods based on historical gameplay data or historical object data from a same player and/or other players playing a same game title. The historical object data may be associated with whether there are certain activity, zones, actors, or mechanics that would indicate that either the player is at a natural stopping period or not. Historical gameplay data may be associated with when other user accounts paused their respective gameplay sessions in their progression of gameplay of a respective interactive content title.

The supervising control server 170 may further receive content time stamp files 214 for determining relevant media files 212 that may be appropriate to send to the supervising account as context of where the player is at in the gameplay session. For example, when supervising account sends a query regarding the gameplay session, the supervising control server 170 may send a screenshot or a video in addition to the estimated period of time until a natural stopping period or point.

The supervising control server 170 may track a length of time of the gameplay session. Tracking the length of time may be used to determine whether the length of time passes a total allotted time set by the supervising account. The supervising control server 170 may further cause to send a notification, such as via the notification server 180, to a user device associated with the player engaged in the gameplay session that gameplay will end at a predicted stopping point within a natural stopping period, such that the length of time does not pass a total allotted time set by the supervising account. Furthermore, the allotted segments of time may expire after a period of time such that allotted segments of time that are allotted over time are not rolled over.

Figure 3:
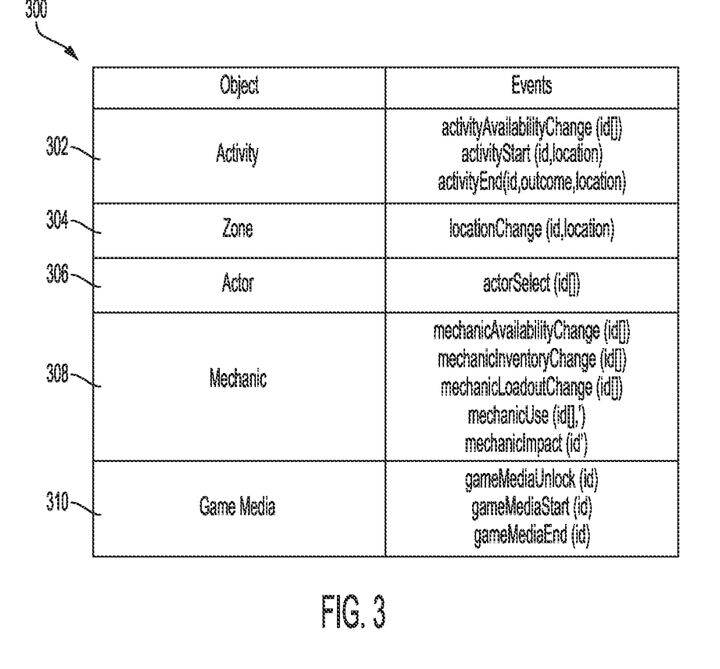
FIG. 3 illustrates an exemplary table of various objects and associated events.

FIG. 3 illustrates an exemplary table 300 of various objects and associated events, according to an aspect of the present disclosure. As shown in the example table 300 of FIG. 3, such object data (e.g., the object file 216) may be associated with event information regarding activity availability change and may be related to other objects with associated object information. Media-object bindings may form telemetry between the objects shown in at least a portion of the streaming media and the streaming media. For example, such object data may be activity data 302, zone data 304, actor data 306, mechanics data 308, game media data 310, and other gameplay-related data.

Such object data (e.g., the object file 216) may be categorized as in in progress, open-ended, or competitive. Such activity data 302 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data 302 may include an activity availability change event for, which may indicate a list or array of currently available activities for the player. For example, this may be used to decide what activities to display in a game plan.

Such zone data 304 may indicate an area of an associated game world with a single coordinate system wherein the zone may have a 2-D map associated with it and may be used to display locations on the zone. If zone data 304 are applicable, each zone may include a zone ID and a short localizable name of the Zone. Such zone data 304 may be associated with a view projection matrix (4×4) to convert from 3-D world coordinates to a 2-D map position. Such zone data 304 may be associated with a location change event that indicates an update to a current in-game location of the player. Such location change event may be posted regularly, or whenever the player's in-game location changes significantly. The platform server 120 may store a latest value in 'state.' Such zone data 304 may include an x, y, z position of the player's avatar in the zone as well as an a, b, c vector indicating the player's avatars orientation or direction. Such zone data 304 may be associate with an activity start event and/or an activity end event and for the activity end event, an outcome of completed, failed, or abandoned may be associated to the activity (e.g., activity ID).

Such actor data 306 may be associated with an entity with behaviors in the game and can be player-controller or game-controlled, and can change dynamically during gameplay. Such actor data 306 may include an actor ID for the actor, a localizable name for the actor, an image of the actor, and/or a short description of the actor. Such actor data 306 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data 308 may be associated with an item, skill, or effect that can be used by the player or the game to impact gameplay (e.g., bow, arrow, stealth attack, fire damage) and may exclude items that do no impact gameplay (e.g., collectibles). Such mechanics data 308 may include a mechanic ID of the mechanic, a short name of the mechanic, an image of the mechanic, and/or a short description of the mechanic. Such mechanics data 308 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data 308 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data 308 may be associated with a mechanic use event that indicates that a mechanic has been used by or against the player and may be used to be displayed as mechanic usage in a UGC context. Such mechanics data 308 may include a list or array of mechanics that were used (e.g., fire arrow, fire damage) or whether an initiator is the player, such that whether the mechanics were used by or against the player. Such mechanics data 308 may include an initiator actor ID, a current zone ID of the initiator actor, and/or a current x, y, z position of the initiator actor. Such mechanics data 308 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data 308 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data 310 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data 310 may be associated with a game media start event that indicates that a particular piece of game media has started in the game right now and a game media end event that indicates that the particular piece of game media has ended.

Figure 4:
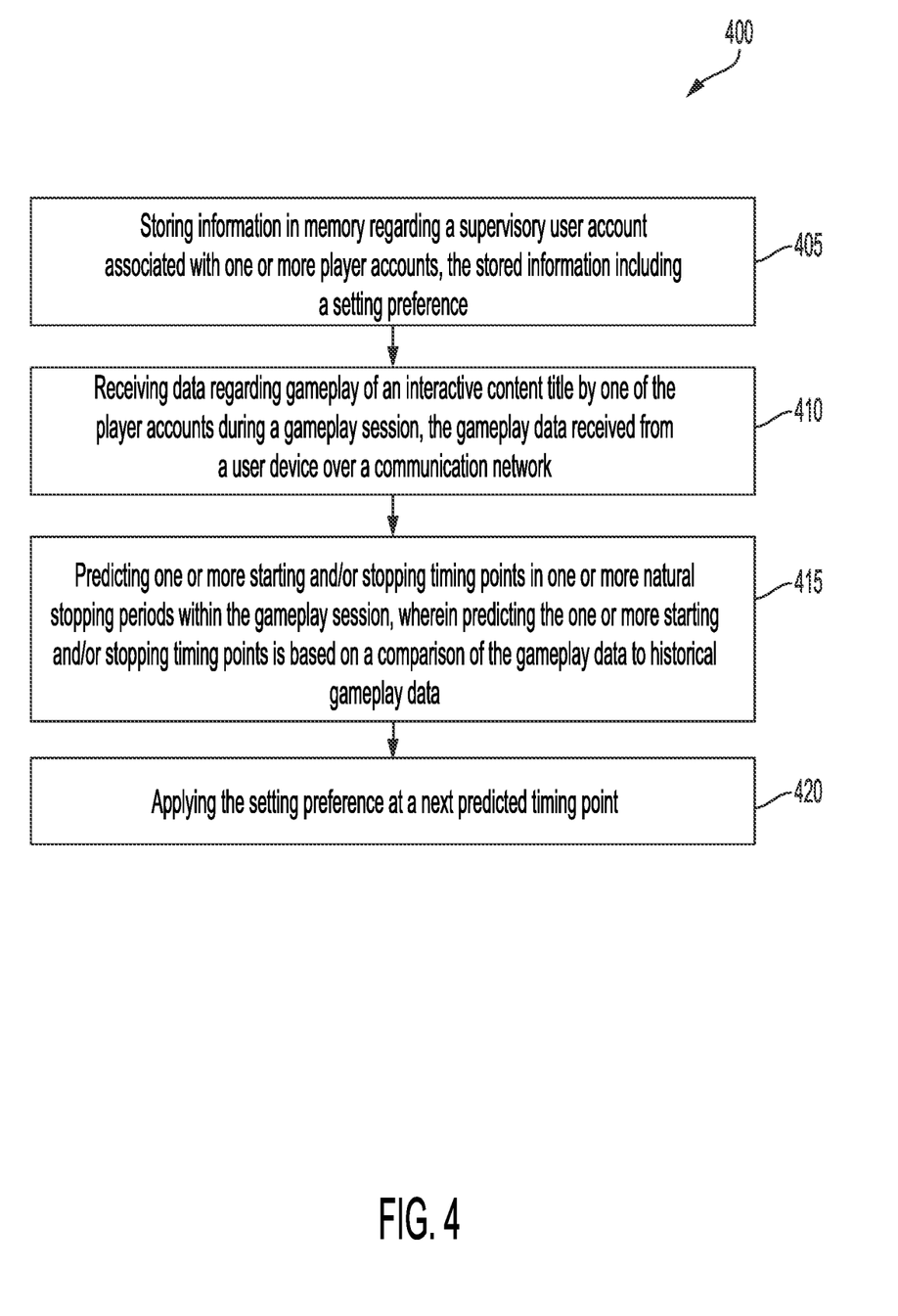
FIG. 4 illustrates a flowchart of an exemplary method for providing predictive customization of supervisory controls over gameplay.

FIG. 4 illustrates a flowchart of an exemplary method 400 for providing predictive customization of supervisory controls over gameplay. Although method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes storing information in memory regarding a supervisory user account associated with one or more player accounts, the stored information including a setting preference at step 405. For example, the database 140 illustrated in FIG. 1 may store information in memory regarding a supervisory user account associated with one or more player accounts, the stored information including a setting preference.

According to some examples, the method includes receiving data regarding gameplay of an interactive content title by one of the player accounts during a gameplay session, the gameplay data received from a user device over a communication network at step 410. For example, the supervising control server 170 illustrated in FIGS. 1 and 2 may receive data regarding gameplay of an interactive content title by one of the player accounts during a gameplay session, the gameplay data received from a user device over a communication network.

According to some examples, the method 400 includes predicting one or more starting and/or stopping timing points in one or more natural stopping periods within the gameplay session at step 415. For example, the supervising control server 170 illustrated in FIGS. 1 and 2 may predict one or more start and/or stop timing points in one or more natural stopping periods within the gameplay session. In some examples, predicting the one or more starting and/or stopping timing points is based on a comparison of the gameplay data to historical gameplay data.

According to some examples, the method includes applying the setting preference at a next predicted timing point at step 420. For example, the supervising control server 170 illustrated in FIGS. 1 and 2 may apply the setting preference at a next predicted timing point.

According to some examples, the method includes recording the historical gameplay data when one or more user accounts pause their respective gameplay sessions of the interactive content title. For example, the supervising control server 170 illustrated in FIGS. 1 and 2 may record the historical gameplay data when one or more user accounts pause their respective gameplay sessions of the interactive content title. In some examples, the historical gameplay data includes activity data related to respective timestamps at which the respective gameplay sessions were paused. In some examples, recording segments of gameplay media based on timestamps associated with activity data.

According to some examples, the method includes providing a display of one or more segments of the gameplay media to the supervisory user account. For example, the supervising control server 170 illustrated in FIGS. 1 and 2 may provide a display of one or more segments of the gameplay media to the supervisory user account.

According to some examples, the method includes receiving a query from the supervisory user account regarding the gameplay session. For example, the supervising control server 170 illustrated in FIGS. 1 and 2 may receive a query from the supervisory user account regarding the gameplay session.

According to some examples, the method includes sending an estimated period of time to the supervisory user account. For example, the supervising control server 170 illustrated in FIGS. 1 and 2 may send an estimated period of time to the supervisory user account. In some examples, the estimated period of time is calculated based on a next natural stopping periods of the one or more natural stopping periods.

According to some examples, the method includes receiving a message from the supervisory user account. For example, the supervising control server 170 illustrated in FIGS. 1 and 2 may receive a message from the supervisory user account.

According to some examples, the method includes sending the message to a device displaying the gameplay session as an overlay notification without pausing the gameplay session. For example, the supervising control server 170 illustrated in FIGS. 1 and 2 may send the message to a device displaying the gameplay session as an overlay notification without pause the gameplay session.

According to some examples, the method includes tracking a length of time of the gameplay session. For example, the supervising control server 170 illustrated in FIGS. 1 and 2 may track a length of time of the gameplay session.

According to some examples, the method includes sending in the message that gameplay will end at a predicted stopping point within a natural stopping period of the one or more natural stopping periods. For example, the supervising control server 170 illustrated in FIGS. 1 and 2 may send in the message that gameplay will end at a predicted stopping point within a natural stopping period of the one or more natural stopping periods. In some examples, the length of time does not pass a total allotted time set by the supervisory user account. In some examples, allotted segments of time of the total allotted time expires after a period of time.

Figure 5:
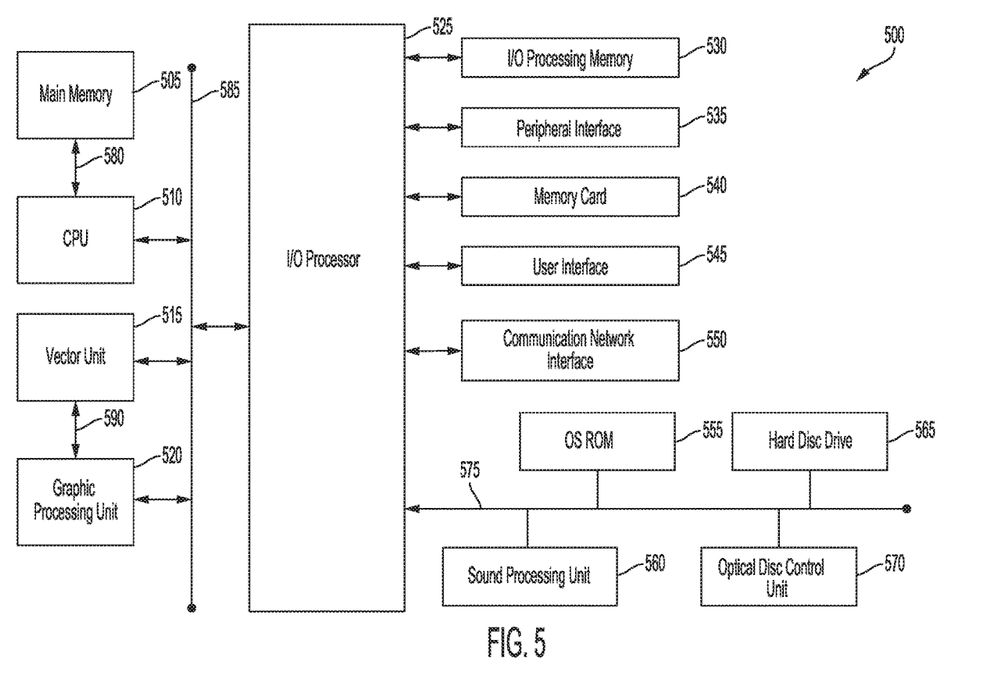
FIG. 5 is a block diagram of an exemplary electronic entertainment system that may be used in embodiments of the present invention.

FIG. 5 is a block diagram of an exemplary electronic entertainment system 500 that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct an avatar in a game to perform some specified action.

The present disclosure pertains to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing gameplay transitions, the method comprising:
storing information in memory regarding a setting preference for a player account,
wherein the setting preference includes one or more time-based restrictions on gameplay;
tracking real-time gameplay data associated with a gameplay session of an interactive content title by the player account;
identifying a current trajectory of gameplay based on one or more patterns within the tracked real-time gameplay data;
predicting one or more gameplay end points of time based on the identified current trajectory;
generating a notification based on one of the time-based restrictions and the predicted gameplay end points of time, wherein the notification includes one or more selectable options for transitioning out of the gameplay session; and
transmitting the notification over a communication network to a user device associated with a supervisory account, wherein the user device executes a selected one of the options for transitioning out of the gameplay session.

2. The method of claim 1, wherein the time-based restrictions are associated with different predetermined amounts of transition time.

3. The method of claim 2, further comprising providing an option in the notification to receive a new transition time or an adjustment to one of the predetermined transition times.

4. The method of claim 1, further comprising providing an option in the notification to relay a customized message to a user device associated with the player account.

5. The method of claim 1, further comprising transmitting another notification to a user device associated with the player account when the user device embarks on a new level that is predicted to end past a time limit of the one time-based restriction.

6. The method of claim 1, further comprising predicting the gameplay end points of time is based on a comparison of the real-time gameplay data to historical gameplay data.

7. The method of claim 1, further comprising applying the setting preference at the predicted gameplay end points of time in the gameplay session, wherein applying the setting preference includes executing a control action associated with the setting preference.

8. A system for providing gameplay transitions, the system comprising:
memory that stores information regarding a setting preference for a player account,
wherein the setting preference includes one or more time-based restrictions on gameplay;
a processor that executes instructions stored in the memory, wherein the processor executes the instructions to:
track real-time gameplay data associated with a gameplay session of an interactive content title by the player account;
identify a current trajectory of gameplay based on one or more patterns within the tracked real-time gameplay data;
predict one or more gameplay end points of time based on the identified current trajectory; and
generate a notification based on one of the time-based restrictions and the predicted gameplay end points of time, wherein the notification includes one or more selectable options for transitioning out of the gameplay session; and
a communication interface that communicates over a communication network to transmit a notification to a user device associated with a supervisory account, wherein the user device executes a selected one of the options for transitioning out of the gameplay session.

9. The system of claim 8, wherein the time-based restrictions are associated with different predetermined amounts of transition time.

10. The system of claim 9, wherein the processor executes further instructions to provide an option in the notification to receive a new transition time or an adjustment to one of the predetermined transition times.

11. The system of claim 8, wherein the processor executes further instructions to provide an option in the notification to relay a customized message to a user device associated with the player account.

12. The system of claim 8, wherein the communication interface further transmit another notification to a user device associated with the player account when the user device embarks on a new level that is predicted to end past a time limit of the one time-based restriction.

13. The system of claim 8, wherein the processor executes further instructions to predict the gameplay end points of time based on a comparison of the real-time gameplay data to historical gameplay data.

14. The system of claim 8, wherein the processor executes further instructions to apply the setting preference at the predicted gameplay end points of time in the gameplay session, wherein applying the setting preference includes executing a control action associated with the setting preference.

15. A non-transitory, computer readable storage medium having embodied thereon instructions executable by a computing system to perform a method for providing gameplay transitions, the method comprising:
- storing information in memory regarding a setting preference for a player account,
wherein the setting preference includes one or more time-based restrictions on gameplay;
- tracking real-time gameplay data associated with a gameplay session of an interactive content title by the player account;
- identifying a current trajectory of gameplay based on one or more patterns within the tracked real-time gameplay data;
- predicting one or more gameplay end points of time based on the identified current trajectory;
- generating a notification based on one of the time-based restrictions and the predicted gameplay end points of time, wherein the notification includes one or more selectable options for transitioning out of the gameplay session; and
- transmitting the notification over a communication network to a user device associated with a supervisory account, wherein the user device executes a selected one of the options for transitioning out of the gameplay session.

16. The non-transitory, computer readable storage medium of claim 15, wherein the time-based restrictions are associated with different predetermined amounts of transition time.

17. The non-transitory, computer readable storage medium of claim 16, further comprising instructions executable to provide an option in the notification to receive a new transition time or an adjustment to one of the predetermined transition times.

18. The non-transitory, computer readable storage medium of claim 15, further comprising instructions executable to provide an option in the notification to relay a customized message to a user device associated with the player account.

19. The non-transitory, computer readable storage medium of claim 15, further comprising instructions executable to transmit a notification to a user device associated with the player account when the user device embarks on a new level that is predicted to end past a time limit of the one of the time-based restrictions.

20. The non-transitory, computer readable storage medium of claim 15, further comprising instructions executable to predict the predicted gameplay end points of time based on a comparison of the real-time gameplay data to historical gameplay data.

* * * * *